US011125111B2

(12) United States Patent
Mason et al.

(10) Patent No.: US 11,125,111 B2
(45) Date of Patent: Sep. 21, 2021

(54) OIL SYSTEM (71) Applicants: ROLLS-ROYCE plc, London (GB); Rolls-Royce Deutschland Ltd & Co KG, Dahlewitz (DE)

(72) Inventors: John R Mason, Bristol (GB); Thomas Philip Astley, Berlin (DE)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 246 days.

(21) Appl. No.: 16/283,085

(22) Filed: Feb. 22, 2019

(65) Prior Publication Data

US 2019/0292944 A1 Sep. 26, 2019

(30) Foreign Application Priority Data

Mar. 21, 2018 (GB) .................................... 1804506

(51) Int. Cl.
*F01D 25/20* (2006.01)
*F16H 57/04* (2010.01)
(Continued)

(52) U.S. Cl.
CPC .............. *F01D 25/20* (2013.01); *F01D 21/14* (2013.01); *F01M 1/02* (2013.01); *F01M 1/18* (2013.01);
(Continued)

(58) Field of Classification Search
CPC ........... F01D 25/20; F01D 21/14; F01M 1/02; F01M 1/18; F01M 2001/0215; F01M 2001/123; F02C 7/06; F02C 7/36; F16H 57/0442; F16H 57/0471; F16H 57/0476; F16H 57/048; F05D 2260/40311;
(Continued)

(56) References Cited

U.S. PATENT DOCUMENTS 4,356,696 A * 11/1982 Mason .................. F02B 37/166
60/606
4,362,131 A * 12/1982 Mason ..................... F01P 11/08
123/41.1
(Continued)

FOREIGN PATENT DOCUMENTS

EP 1 918 550 A2 5/2008
EP 2224120 A2 9/2010
(Continued)

OTHER PUBLICATIONS

Sep. 18, 2018 Search Report issued in British Application No. 1804506.2.
(Continued)

*Primary Examiner* — Michael A Riegelman
(74) *Attorney, Agent, or Firm* — Oliff PLC (57) ABSTRACT A method (500) and apparatus (50, 60) for lubrication of a gearbox (30) of an aircraft engine comprise provision (502) of oil to the gearbox (30) through a primary oil system (50) driven by a core (11) of the engine (10) in normal conditions; detection (504) of windmilling conditions and/or failure of the primary oil system (50); and in response to the detected condition or failure, activation (506) of an electric pump (61) of an auxiliary oil system (60), to provide oil to the gearbox (30).

15 Claims, 4 Drawing Sheets (51) Int. Cl.
*F01D 21/14* (2006.01)
*F02C 7/36* (2006.01)
*F02C 7/06* (2006.01)
*F01M 1/18* (2006.01)
*F01M 1/02* (2006.01)
*F01M 1/12* (2006.01)

(52) U.S. Cl.
CPC ............... *F02C 7/06* (2013.01); *F02C 7/36* (2013.01); *F16H 57/0442* (2013.01); *F16H 57/0471* (2013.01); *F16H 57/0476* (2013.01); *F01M 2001/0215* (2013.01); *F01M 2001/123* (2013.01); *F05D 2260/40311* (2013.01); *F05D 2260/98* (2013.01); *F05D 2270/09* (2013.01); *F05D 2270/301* (2013.01); *F16H 57/048* (2013.01); *F16N 2210/02* (2013.01); *F16N 2210/14* (2013.01); *F16N 2260/20* (2013.01)

(58) Field of Classification Search
CPC ............ F05D 2260/98; F05D 2270/09; F05D 2270/301; F16N 2210/02; F16N 2210/14; F16N 2260/20
See application file for complete search history.

(56) References Cited

U.S. PATENT DOCUMENTS

| | | | |
|---|---|---|---|
| 8,201,662 B2* | 6/2012 | Delaloye | F01D 25/20 184/6.11 |
| 2001/0047647 A1* | 12/2001 | Cornet | F01D 25/20 60/772 |
| 2007/0193285 A1* | 8/2007 | Knight | G01M 3/228 62/126 |
| 2007/0193300 A1* | 8/2007 | Tilton | H01L 23/427 62/475 |
| 2008/0098712 A1* | 5/2008 | Sheridan | F02C 7/32 60/226.1 |
| 2010/0023169 A1* | 1/2010 | Delaloye | F01D 25/20 700/282 |
| 2010/0086403 A1* | 4/2010 | McCune | F16C 33/1055 415/229 |
| 2010/0294597 A1* | 11/2010 | Parnin | F01D 25/18 184/6.1 |
| 2011/0146823 A1* | 6/2011 | Griffiths | F02C 7/262 137/625.48 |
| 2012/0221157 A1* | 8/2012 | Finney | F01D 15/10 700/287 |
| 2013/0076120 A1* | 3/2013 | Wagner | B64D 33/00 307/9.1 |
| 2013/0319798 A1* | 12/2013 | Sheridan | F01M 11/067 184/6.11 |
| 2015/0361886 A1* | 12/2015 | Roberge | F01M 1/12 417/53 |
| 2016/0258324 A1* | 9/2016 | Cigal | F01D 25/20 |
| 2016/0376949 A1* | 12/2016 | Parnin | F02C 7/06 73/112.01 |
| 2017/0114662 A1* | 4/2017 | Mastro | F02C 3/107 |
| 2017/0114784 A1* | 4/2017 | Parnin | F04B 51/00 |
| 2017/0175874 A1* | 6/2017 | Schwarz | F01D 21/00 |
| 2018/0073395 A1* | 3/2018 | Parnin | F16H 57/0442 |
| 2018/0283283 A1* | 10/2018 | Manoukian | F02C 7/25 |
| 2019/0195091 A1* | 6/2019 | Uhkoetter | F01D 25/20 |
| 2019/0292944 A1* | 9/2019 | Mason | F01D 25/20 |
| 2019/0316488 A1* | 10/2019 | Menczykalski | F02C 7/36 |
| 2019/0316522 A1* | 10/2019 | Menczykalski | F02C 7/36 |
| 2019/0323597 A1* | 10/2019 | Sheridan | F01D 25/20 |

FOREIGN PATENT DOCUMENTS

| | | |
|---|---|---|
| EP | 2 253 805 A2 | 11/2010 |
| EP | 2949883 A1 | 12/2015 |
| EP | 3 293 363 A2 | 3/2018 |
| WO | 2015065720 A1 | 5/2015 |

OTHER PUBLICATIONS

Jul. 26, 2019 Search Report issued in European Patent Application No. 19158620.5.

* cited by examiner

OIL SYSTEM

CROSS-REFERENCE TO RELATED APPLICATIONS

This application is based upon and claims the benefit of priority from British Patent Application Number 1804506.2 filed 21 Mar. 2018, the entire contents of which are incorporated by reference.

BACKGROUND

1. Field of the Disclosure

The present disclosure relates to an auxiliary oil system for an aircraft engine, and more specifically to an auxiliary oil system arranged to protect a gearbox of an aircraft engine, such as a gas turbine engine, during windmill conditions whilst the aircraft is in flight.

2. Description of the Related Art

Known aircraft engines include oil systems mechanically driven by the engine and arranged to lubricate/cool elements of the engine including gearbox bearings. However, if an in-flight event results in engine shut-down, the oil system loses power and the gearbox may not be properly lubricated. As airflow through a fan or propeller of a moving aircraft drives continued rotation of the fan or propeller, the gearbox may be damaged and/or may seize if not properly lubricated, potentially leading to a hazard.

Rotation of the fan or propeller when it is no longer powered by the engine is referred to as windmilling.

On the ground, the fan or propeller may rotate without driving power from the turbine due to wind conditions. Rotation speeds for fans or propellers of parked aircraft are generally not more than 100 revolutions per minute (rpm).

By contrast, during in-flight windmilling the airflow through the fan or propeller is generally much higher, due to the motion of the aircraft, and the windmilling speeds are correspondingly higher (for example, being at least 200 rpm, 300 rpm, or 400 rpm in some cases, and up to 500 rpm in some cases, depending on e.g. aircraft velocity and design) than the ground cases. Bearings of a gearbox may therefore suffer more damage in a shorter timeframe, as compared to windmilling whilst parked.

US 2017/0175874 (A1) discloses an aircraft comprising an auxiliary pump driven by an electric motor. The electric motor is configured to receive electricity when the aircraft is parked (e.g. from a ground-based generator which can be connected to the electric motor) and is adapted to drive the auxiliary pump such that the auxiliary pump circulates lubricating fluid while the aircraft is parked. A sensor is used to detect motion of the fan whilst parked; the auxiliary pump can be activated accordingly.

EP 2224120 (A2) discloses an aircraft turbofan engine with an auxiliary oil pump that is mechanically coupled to the fan shaft. The auxiliary oil pump is therefore located close to the fan shaft and driven whenever the fan is rotating, whether or not the engine is driving the fan rotation. A pressure valve opens to allow the auxiliary oil pump to lubricate the bearings if oil pressure drops below a threshold—otherwise the auxiliary oil pump drives oil around a closed circuit.

SUMMARY

According to a first aspect there is provided a gas turbine engine for an aircraft, the gas turbine engine comprising:

an engine core comprising a turbine, a compressor, and a core shaft connecting the turbine to the compressor;
a fan or propeller;
a gearbox that receives an input from the core shaft and outputs drive to the fan or propeller so as to drive the fan or propeller at a lower rotational speed than the core shaft;
a primary oil system driven by the engine core and arranged to supply oil to bearings of the gearbox, and optionally to other bearings; and
an auxiliary oil system comprising an electric pump arranged to supply the bearings of the gearbox, and optionally the other bearings, with oil in response to shut-down of the engine core in flight.

The gas turbine engine may therefore provide in-flight windmill protection for the gearbox. The skilled person would appreciate that oil flows required for in flight windmilling may be an order of magnitude greater than that required for windmilling on the ground due to the higher fan rotational speed in flight. As a result, a system designed to manage ground windmilling would not generally be capable of providing in flight protection.

The electric pump may also be referred to as the auxiliary pump, as it is the pump of the auxiliary system.

Damage to the bearings of the gearbox may therefore be reduced or avoided, so reducing or eliminating the risk of excessive drag on the airframe caused by a locked fan or propeller.

The skilled person will appreciate that the introduction of a power gearbox between the fan or propeller and driving turbine introduces an additional user to the oil system as compared to direct drive engines. Some failure cases of the gearbox can lead to hazardous conditions for the aircraft unless protection systems are put in place. One such protection is provision of a continuous feed of oil to the bearings (in particular, journal bearings), including during in-flight shutdown scenarios in which the engine windmills (fan/propeller rotates unpowered). An auxiliary oil system is therefore incorporated as a back-up such that a failure in the main oil system does not automatically result in an inability to provide oil to the gearbox. The auxiliary oil system has its own pump, as a pump of the primary system (driven by the engine; usually by the high pressure spool thereof), will not provide flow in windmill conditions, or may itself have failed.

The use of an electric auxiliary system pump may provide one or more of the following features, in various example implementations:

(i) as no mechanical linkage to the turbine or propeller/fan shaft is required to drive the auxiliary pump, there is design flexibility as to where the electric pump can be located on the aircraft;
(ii) as there is no mechanical linkage to the turbine or propeller/fan shaft to drive the auxiliary pump, the pump is not necessarily active whenever the turbine or shaft is rotating. This may reduce energy wastage as it can be activated when needed and deactivated when not needed;
(iii) as the pump is electric, it can be stopped and started by engine electronic controls with no mechanical changes;
(iv) for some kinds of electric pump, pumping rate can be varied as required with an electronic controller; and/or
(v) for some arrangements, the pump can be started before the engine, or any other engine, of an aircraft is started. The electric pump can therefore be used to warm up the oil system and/or ensure that the oil pressure in the gearbox is sufficient before an engine is switched on, and/or before the fan or propeller starts to rotate.

The increased flexibility of location due to the avoidance of a need for a mechanical connection to the gearbox/a shaft may allow the auxiliary pump to be placed in a more accessible location, for example a location that is convenient for maintenance and repairs. In such arrangements, the auxiliary pump could be replaced without the need for engine removal, which may improve operating costs and reduce disruptions Further, system reliability may be improved due to the positioning of the auxiliary pump; as the auxiliary pump is not mechanically linked to the torque path it may be less exposed to vibrations in the event of bird strike, fan blade damage, or the likes.

The skilled person will appreciate that not having to operate the pump continuously may increase pump lifespan and reliability. With a mechanical pump, operation of the pump is continuous whilst the shaft is rotating/engine is active; this may lead to challenges in meeting reliability requirements. Continuous operation could be avoided with a clutch system arranged to decouple the pump from the turbine and/or fan or propeller, however there are reliability considerations with such a solution. Continuous running of the pump results in work extraction from the main engine cycle at all conditions. Unless the flow from the pump is utilised, this power is a loss from the cycle. Utilising the flow whilst keeping the auxiliary system independent of the main system may present different challenges. Use of an electric pump avoids these challenges as it can be activated and deactivated as desired.

The mechanical solution adds a requirement for the pump to not only deliver the required flow with windmill drive speeds but manage the flows associated with normal operation. In normal operation the drive speed into the pump could be four times (or more) that at windmill. This potentially results in a pump far larger than one based on an electric system.

As compared to a system using a mechanical pump, fewer valves may be required (which can be points of failure). The electric pump can be switched off when not needed.

The pump may function with or without scavenge capacity, which may provide flexibility to the system. For example, a gravity feed may be sufficient in some arrangements, so avoiding the need for a separate scavenger ("scav") pump.

According to a second aspect, there is provided a gas turbine engine for an aircraft, the gas turbine engine comprising:
  an engine core comprising a turbine, a compressor, and a core shaft connecting the turbine to the compressor;
  a fan or propeller;
  a gearbox that receives an input from the core shaft and outputs drive to the fan or propeller so as to drive the fan or propeller at a lower rotational speed than the core shaft;
  a primary oil system driven by the engine core and arranged to supply bearings of the gearbox with oil; and
  an auxiliary oil system comprising:
    an electric pump arranged to be selectively activated, and to supply the bearings of the gearbox with oil, during flight, when activated;
    a sensor arranged to detect windmilling and/or failure of the primary oil system during flight; and
    control electronics arranged to receive an output from the sensor, and to activate the electric pump in response to detected windmilling or failure.

The sensor may be or comprise, for example, a pressure sensor, e.g. a gearbox oil pressure sensor, a motion sensor, e.g. a fan/propeller motion sensor, and/or an electrical sensor arranged to detect a signal, or cessation of a signal, from the engine core.

Other features may be as described for the first aspect.

According to a third aspect there is provided a gas turbine engine for an aircraft, the gas turbine engine comprising:
  an engine core comprising a turbine, a compressor, and a core shaft connecting the turbine to the compressor;
  a fan or propeller;
  a gearbox that receives an input from the core shaft and outputs drive to the fan or propeller so as to drive the fan or propeller at a lower rotational speed than the core shaft;
  a primary oil system driven by the engine core and arranged to supply bearings of the gearbox with oil; and
  an auxiliary oil system comprising:
    an electric pump arranged to supply the bearings of the gearbox with oil once activated;
    a pressure sensor arranged to monitor gearbox oil pressure; and
    control electronics arranged to receive an output from the pressure sensor and to activate the electric pump in response to the gearbox oil pressure falling below a threshold.

The use of control electronics may facilitate the electric pump being inactive when not needed, so reducing power/energy requirements.

The use of a pressure sensor with the control electronics may facilitate the electric pump being activated automatically when it is needed.

Further, the pump may be activated before an engine shuts down completely, or without an engine shutting down completely or at all, if the oil pressure is insufficient. For example, if a pump of the primary oil system fails, the electric pump of the auxiliary oil system may be activated.

Further, in some arrangements, the pressure sensor may facilitate the electric pump being activated automatically whether or not the fan or propeller is rotating. The skilled person will appreciate that this may be beneficial for system warm-up in some scenarios. In other arrangements, direct selection by a pilot (or other user) of an engine warm-up mode may be required to activate the pump when the fan or propeller is not rotating.

Other features may be as described for the first and/or second aspect.

The following optional features can be applied to the engine of the first, second and/or third aspects.

The gearbox may be an epicyclic gear box.

The electric pump may be powered by a power source other than the engine core. In the arrangements being described, the electric pump is powered by a power source located on, or forming part of, the aircraft.

The power source may be one or more of:
  (i) a further gas turbine engine of the aircraft;
  (ii) a battery;
  (iii) a ram air turbine; and
  (iv) an auxiliary power unit.

The power source may be mounted on, or a part of, the engine arranged to be lubricated by the auxiliary oil system.

The power source may be mounted on, or a part of, the aircraft.

The power source may be a further gas turbine engine of the aircraft if the further gas turbine engine is providing power, and a ram air turbine, battery, or other power source of the aircraft if not.

The electric pump may be selected to be capable of pumping up to 10 litres of oil per minute around the auxiliary oil system. The electric pump may be selected to be capable of pumping 10 litres of oil per minute around the auxiliary oil system.

The electric pump may be selected to be capable of pumping up to 30 litres of oil per minute around the auxiliary oil system. The electric pump may be selected to be capable of pumping between 10 and 30 litres of oil per minute around the auxiliary oil system. The electric pump may be selected to be capable of pumping 30 litres of oil per minute around the auxiliary oil system.

The skilled person would appreciate that desired oil flow rate may depend on engine size and on gearbox ratio, which influences the speed of gearbox components.

The electric pump may be sized to provide an oil flow rate sufficient for gearbox bearing lubrication at any achievable windmilling speeds, for example, at windmilling speeds of around or above 200 rpm, around or above 300 rpm, or around or above 400 rpm.

The auxiliary oil system may be sized to provide lubrication sufficient for a rotation speed of the fan or propeller of around or above 300 revolutions per minute.

The electric pump may be a fixed displacement pump.

The electric pump may comprise a pump controller arranged to allow the flow rate around the auxiliary oil system to be varied. The pump may therefore be a variable speed pump. In some arrangements, the variation in flow rate may depend on flight conditions and/or gearbox speed (either output (fan) speed, or input (turbine) speed).

A variable speed pump may do at least one of facilitating system checks and/or tests, and allowing oil flow rate to be adjusted based on windmilling speeds or gearbox oil pressure.

The gas turbine engine may be a turbofan engine.

The bearings of the gearbox may comprise at least one journal bearing.

The primary oil system and the auxiliary oil system may each have separate connections to the gearbox.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to a fourth aspect, there is provided an auxiliary oil system for an aircraft gas turbine engine having a gearbox arranged to be lubricated by a primary oil system, the auxiliary oil system comprising:
  an electric pump arranged to be selectively activated, and to supply bearings of the gearbox with oil, during flight, when activated;
  a sensor arranged to detect windmilling and/or failure of the primary oil system during flight; and
  control electronics arranged to receive an output from the sensor, and to activate the electric pump in response to detected windmilling or failure.

According to a fifth aspect, there is provided an auxiliary oil system for an aircraft gas turbine engine having a gearbox. The auxiliary oil system comprises:
  an electric pump arranged to supply bearings of the gearbox with oil once activated;
  a pressure sensor arranged to monitor gearbox oil pressure; and
  control electronics arranged to receive an output from the pressure sensor and to activate the electric pump in response to the gearbox oil pressure falling below a threshold.

According to a sixth aspect, there is provided an auxiliary oil system for an aircraft gas turbine engine having a gearbox. The auxiliary oil system comprises an electric pump arranged to supply bearings of the gearbox with oil in response to shut-down of the engine core and/or detection of windmilling in flight The auxiliary oil system of fourth, fifth and/or sixth aspects may have any or all of the features as described for the auxiliary oil system of the engine of the first, second and/or third aspects.

According to a seventh aspect, there is provided a method of lubricating a gearbox of a gas turbine engine of an aircraft during flight, the method comprising:
  providing oil to the gearbox through a primary oil system driven by a core of the engine;
  detecting windmilling conditions and/or failure of the primary oil system; and
  in response to the detected condition or failure, activating an electric pump of an auxiliary oil system, to provide oil to the gearbox.

The detection of windmilling conditions and/or failure of the primary oil system may comprise detection of a drop in gearbox oil pressure below a threshold during flight.

The gearbox, gas turbine engine and oil systems may have any or all of the features as described for the preceding aspects.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans (or propellers) that are arranged to be driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The skilled person will appreciate that the discussion of fans herein can also be applied to propellers, as appropriate, and that a turbofan engine is selected for description by way of example only.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades. The propeller of a gas turbine as described and/or claimed herein may similarly have any desired number of propeller blades. The skilled person will appreciate that propellers of gas turbines generally have fewer blades than fans; for example between 2, 3, 4, 6, 8, or 10 blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000m to 15000m, for example in the range of from 10000m to 12000m, for example in the range of from 10400m to 11600m (around 38000 ft), for example in the range of from 10500m to 11500m, for example in the range of from 10600m to 11400m, for example in the range of from 10700m (around 35000 ft) to 11300m, for example in the range of from 10800m to 11200m, for example in the range of from 10900m to 11100m, for example on the order of 11000m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
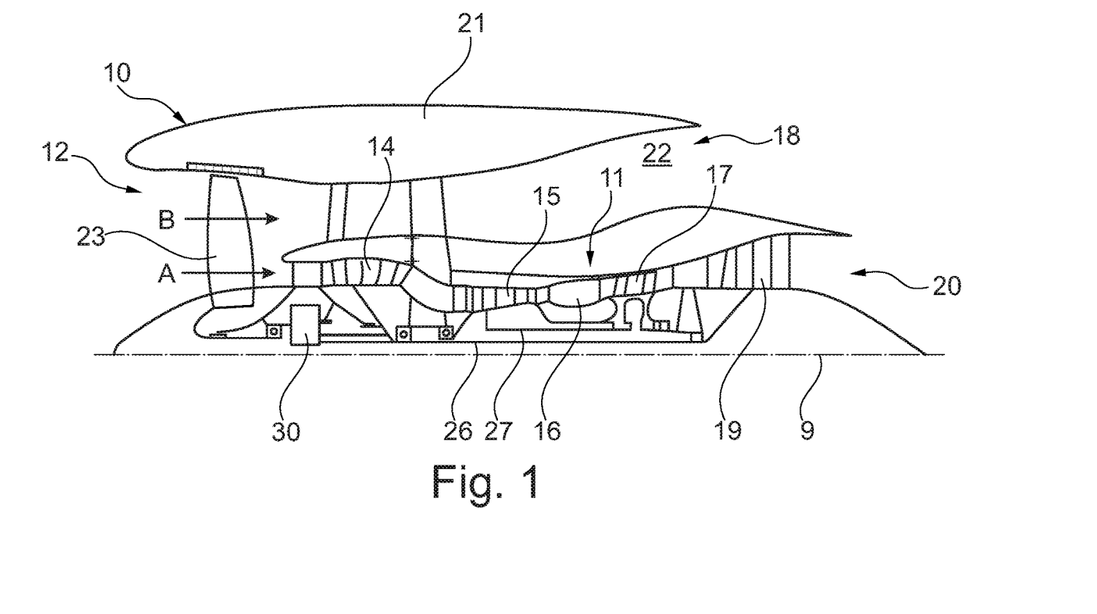
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
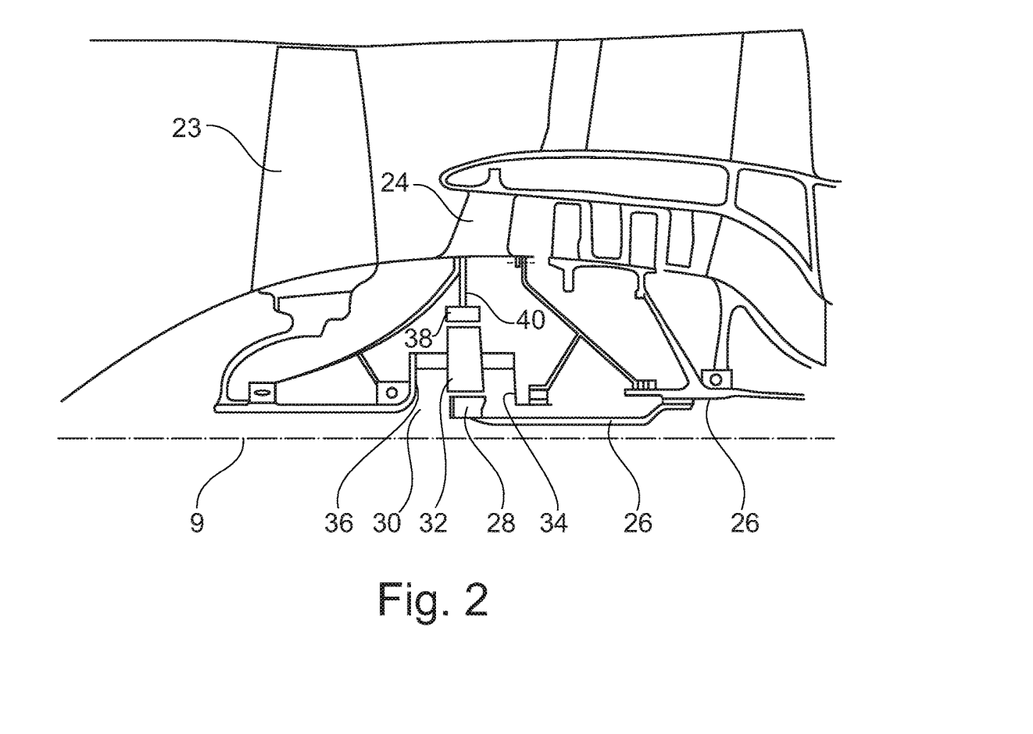
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
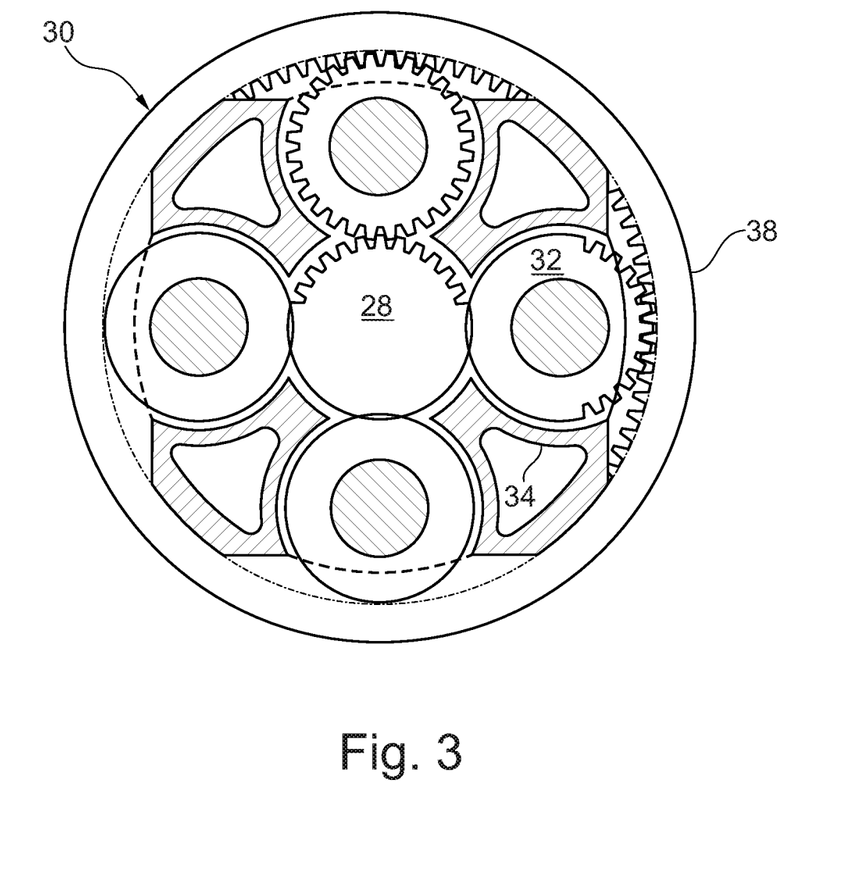
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2. By way of further example, the skilled person will appreciate that, in alternative embodiments, one or more propellers may replace the fan 23. Further, the fan 23 or propeller may not be enclosed. Similarly, any appropriate gearbox may be used in place of the epicyclic gearbox 30 described by way of example.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor engine (in which the fan stage is not surrounded by a nacelle), or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The gearbox 30 comprises one or more bearings. In the arrangement being described, the gearbox 30 comprises one or more journal bearings. The skilled person will appreciate that lubrication may be more important for journal bearings, as compared to various other bearing types, as journal bearings are generally intended to have a pressurised oil film between the bearing and the shaft to provide support to the shaft. Correspondingly, the amount and pressure of oil supplied for lubrication of journal bearings may be higher than that for other bearing types, as a continuous feed of oil may be desired.

The gearbox 30 illustrated by way of example in FIGS. 2 and 3 is generally lubricated with oil provided by a primary oil system 50. The primary oil system 50 comprises two pumps 51, 52: a scavenger pump 51 (often referred to as a scav pump) arranged to pump oil from the gearbox 30 into an oil tank 53, and a feed pump 52 arranged to pump oil from the oil tank 53 back to the gearbox 30. In alternative arrangements, only one pump may be provided, or more than two pumps may be provided. In alternative or additional arrangements, no oil tank may be provided—instead, sufficient oil may be stored in the connections between the pump(s) 51, 52 and gearbox 30 and the gearbox 30 itself.

Figure 4:
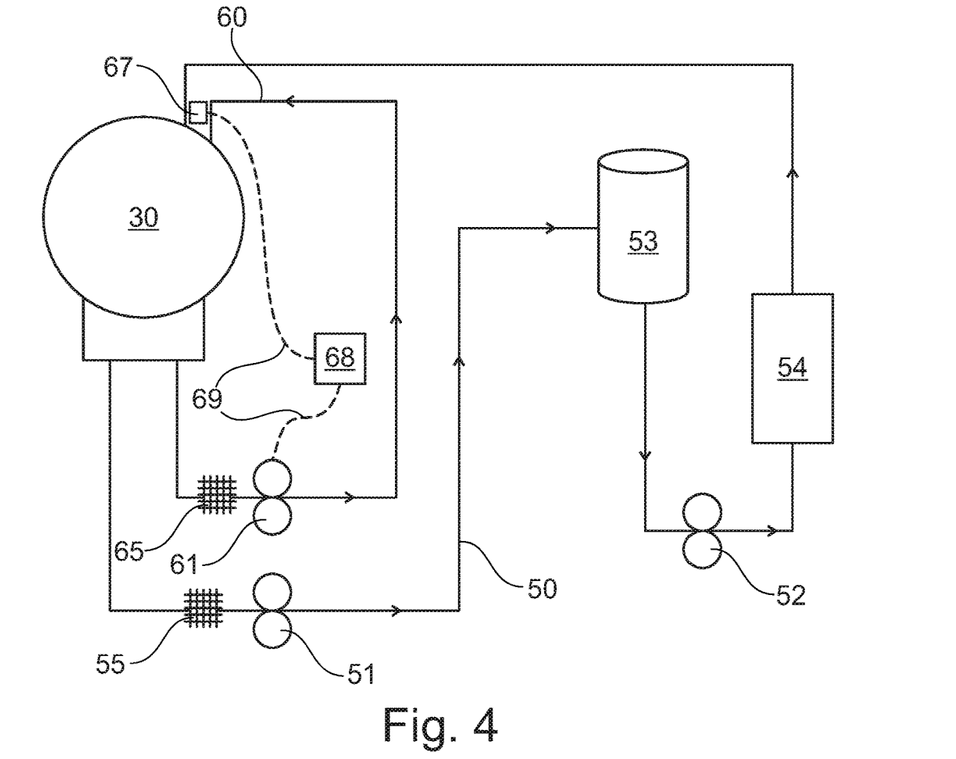
FIG. 4 is a schematic view of oil systems for a gas turbine engine.

The pumps 51, 52 of the primary oil system 50 are driven by the gas turbine engine 10. In the arrangement shown, the pumps 51, 52 are mechanically coupled to the engine core 11, and more specifically to the core shaft 26, and so are driven whenever the engine is operating.

In the arrangement shown in FIG. 4, the primary oil system 50 comprises a cooler 54. The cooler 54 is arranged to cool the oil. The oil may therefore be used to cool the gearbox 30, by carrying heat out of it. In alternative arrangements, no cooler may be provided, multiple coolers may be provided, or the one or more coolers may be differently positioned in the primary oil system 50—for example being between the gearbox 30 and the oil tank 53 instead of between the oil tank 53 and the gearbox 30, in the direction of oil circulation.

In the arrangement shown in FIG. 4, the primary oil system 50 comprises a filter 55 arranged to remove any solids from the oil. In alternative arrangements, no filter may be provided, or multiple filters may be provided. The filters 55 may be differently positioned in the primary oil system 50—for example being adjacent to, or a part of, the oil tank 53 instead of adjacent to the oil outlet from the gearbox 30.

An auxiliary oil system 60 is also provided. The auxiliary oil system 60 is arranged to provide oil to the gearbox 30 if the primary oil system 50 is not providing sufficient oil—for example following engine shutdown in flight or failure of a pump 51, 52.

The auxiliary oil system 60 illustrated in FIG. 4 comprises an electric pump 61 (also referred to as an auxiliary pump) arranged to pump oil around a circuit from and back to the gearbox 30. In the arrangement shown, no oil tank is provided—instead, sufficient oil may be stored in the connections between the pump(s) 51, 52 and gearbox 30 and the gearbox 30 itself. In alternative arrangements, an oil tank may be provided in the auxiliary oil system 60. In such embodiments, a second electric pump may also be provided, such that there is a first (scav) pump between the gearbox 30 and the oil tank and a second (feed) pump between the oil tank and the gearbox 30, in the direction of oil flow.

The electric pump 61 is powered by a power source other than the gas turbine engine 11. The power source is an airborne power source. The power source is mounted in association with the gas turbine engine 10 or aircraft. The power source may be mounted on the engine (e.g. a battery, auxiliary power unit or RAM air turbine) or elsewhere on the aircraft (e.g. another engine etc.).

In the arrangement shown in FIG. 4, the electric pump 61 has an electrical connection to a second gas turbine engine (not shown) of the aircraft—if the first engine 11 shuts down in flight, the second engine should still be active and able to provide power to the auxiliary oil system 60 of the first engine 11. The second engine may be the only other engine of an aircraft (twin engine aircraft), or may be another engine of multiple engines (e.g. a quad engine aircraft). In aircraft with more than two engines, electrical connections to some or all other engines may be provided for the electric pump 61, for example so that the electric pump 61 can still draw power so long as at least one engine is operating.

In the arrangement shown in FIG. 4, the electric pump 61 additionally has an electrical connection to a battery (not shown). The battery can power the electric pump 61 if power from the second gas turbine engine is not available—for example if both engines of a two-engine plane have shutdown, or if it is desired to get the oil moving before starting the engines, for example as part of a system warm-up procedure, or for testing of the electric pump 61. In the arrangement shown, a rechargeable battery arranged to be recharged by the second engine or an auxiliary power unit is provided. The capacity of the battery may be selected based on pump power requirements, recharge capability and expected duration of windmilling. For example, if the pump 61 requires 1 kW of power to operate, and windmilling for up to 4 hours is to be accommodated, a 4 kWh battery would be required at a minimum were it not rechargeable. The recharge capability may be calculated and battery capacity reduced on that basis.

In the arrangement shown, the battery is mounted on the engine 10. In alternative arrangements, the battery may be mounted elsewhere on the aircraft with an electrical connection to the electric pump 61. In alternative arrangements, no battery may be provided.

The skilled person will appreciate that in-flight windmill conditions may involve fan/propeller rotation speeds of around 200 rpm or more, 300 rpm or more, or 400 rpm or more. Further, windmilling conditions may be maintained for prolonged periods of time; for example around four hours or around seven hours. In arrangements in which power from a second engine is not provided to the auxiliary oil system 60, or not to be relied upon, an aircraft ram air turbine (RAT) or the likes, higher-capacity batteries and/or one or more auxiliary power units may be used.

If the engine core 11 with which the auxiliary system 60 is associated fails in flight, the electric pump 61 can therefore be powered by the aircraft from the electrical generation from any of the remaining operating engine(s). However, in the case of shutdown of/unavailability of power from any engine, power could be provided by the aircraft Ram Air Turbine, batteries, another known auxiliary power unit, or an equivalent future system.

In the arrangement shown in FIG. 4, the auxiliary oil system 60 comprises a filter 65 arranged to remove any solids from the oil. In alternative arrangements, no filter may be provided, or multiple filters may be provided. The filters 65 may be differently positioned in the auxiliary oil system 60—for example being adjacent to the oil inlet into the gearbox 30 instead of adjacent to the oil outlet from the gearbox 30.

In the arrangement shown in FIG. 4, the primary oil system 50 and the auxiliary oil system 60 are separate, in that no components are shared (excluding the gearbox 30, to which each system 50, 60 is connected). Each oil system 50, 60 has its own pipes connecting the respective pump(s) 51, 52, 61 and other components 55, 65, 53, 54 to the gearbox 30. The skilled person will appreciate that the auxiliary oil system 60 may therefore still be able to operate in scenarios in which it is the primary oil system 50, and not the engine 10, that fails.

In some alternative or additional arrangements with separate oil systems 50, 60, failsafe valves may be provided, for example at oil system inlets and outlets to/from the gearbox 30, to close the inlet/outlet if certain conditions are met—the skilled person would appreciate that this could be used to isolate a damaged primary oil system 50 from the gearbox 30, for example, to reduce the risk of further oil loss.

In the arrangement shown in FIG. 4, the electric pump 61 is a fixed displacement pump. The fixed displacement pump 61 provides a set oil flow rate. The fixed displacement pump 61 may be relatively simple, with low maintenance requirements as compared to variable-speed pumps.

In alternative arrangements, a variable-speed pump may be used. The skilled person will appreciate that power demand on the pump 61 will generally be lower for windmill conditions than that during normal (i.e. powered fan/propeller) flight due to a lower oil flowrate and lower system pressures being desired after engine shut down as a result of the generally lower fan/propeller rotation speed; therefore the work demanded from the pump 61 is generally small as compared to the work done by the pumps 51, 52 of the primary oil system. However, if the auxiliary system 60 is to be used due to a failure of the primary system 50, not of the engine core 11, the power desired may be the same as is typically demanded from the primary oil system 50. A variable-speed pump may therefore be useful to allow the power to be increased when required. In addition, use of the auxiliary system 50 for system warm-up tests, pre-flight checks, and/or other processes, e.g. circulating oil before the engines are switched on, may be facilitated with a variable-speed pump. The skilled person would appreciate that a fixed displacement pump could be used instead of a variable-speed pump, in such arrangements.

As an auxiliary oil system 60 is a safety-related feature, it may be subject to pre-(and/or post-) flight checks (e.g. Built-In Test Equipment, or "BITE", checks). This check could additionally be used to prime the pump and remainder of the system for quick initiation of the flow when required. This pre-flight test could have a secondary function of improving the cold start capabilities as it could be used to circulate and warm the oil flowing around the gearbox 30 before the shafts begin rotation.

Arrangements in which the power/throughput of the electric pump 61 may be varied may be advantageous in such scenarios. A fixed displacement pump 61 may be most suitable in scenarios in which the pump 61 is only used in in-flight windmill conditions.

Figure 5:
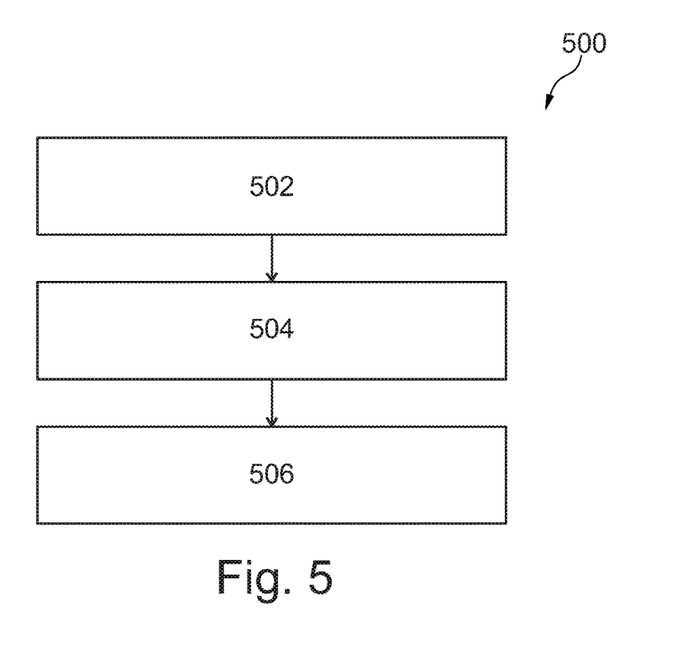
FIG. 5 is a flow chart illustrating a gearbox lubrication method.

FIG. 5 illustrates a method 500 of gearbox lubrication for a gearbox 30 of an aircraft engine 10. The method 500 may be implemented using any arrangement described herein, or any appropriate variation thereof.

At step 502, oil is provided to the gearbox through a primary oil system 50 driven by a core 11 of the engine 10.

At step 504, windmilling conditions and/or failure of the primary oil system 50 and/or engine shutdown is detected.

At step 506, in response to the detected condition or failure, an electric pump 61 of an auxiliary oil system 60 is activated, to provide oil to the gearbox 30.

During normal operation the electric pump 61 is inactive; the primary oil system 50 lubricates the gearbox 30 and the auxiliary oil system 60 is not used.

In the arrangement shown, once the engine electronic controls 68 detect an in-flight shutdown of the engine 10, operation of the electric pump 61 is initiated.

In the arrangement shown, a sensor 67 arranged to detect windmilling and/or failure of the primary oil system 50 is provided. The sensor 67 provides a sensor output. In the arrangement being described, the sensor 67 senses oil feed pressure.

In the arrangement shown, control electronics 68 are provided, arranged to activate (and/or deactivate) the electric pump 61 based on the sensor output. In some arrangements, different electronics 68 may be used to detect an in-flight shutdown of the engine 10 from the control electronics used to activate (and/or deactivate) the electric pump 61.

The pump 61, sensor 67 and electronic controls 68 may be connected by direct or indirect wired connections 69, or by non-wired connections, or by a combination of the two.

In the arrangement shown, detection of in-flight shutdown (of the engine 10, which would result in windmilling, or of the primary oil system 50) is performed using a pressure sensor 67. In alternative or additional arrangements, other sensors may be used; for example a motion sensor to detect motion of the fan 23 or propeller and/or an electrical or motion sensor to detect generation by/movement of the turbine.

In the arrangement shown, the pressure sensor 67 is arranged to monitor oil pressure within the gearbox 30. The pressure sensor may be located, for example, on the gearbox 30, or elsewhere within the primary oil system 50. In response to the gearbox oil pressure falling below a threshold level, the electric pump 61 is activated.

In the arrangement shown, the pump 61 is deactivated when the oil pressure exceeds a second threshold, indicating that the primary oil system 50 is working again. The dame pressure sensor, or a different pressure sensor (e.g. within the secondary oil system 60), may be used. In the arrangement shown, the second threshold is higher than the first threshold. In alternative arrangements, the threshold values may be the same. The skilled person will appreciate that suitable threshold values are likely to vary between different engine designs. In alternative or additional arrangements, a manual or electronic switch or other control may be provided for user input so that a user, e.g. a pilot, can deactivate the electric pump 61.

In alternative arrangements, the control electronics 68 may be arranged to receive an electronic signal from the engine 10. Cessation of that signal may be taken as an indication that the engine 10 has shut down, and may be used to prompt activation of the electric pump 61.

Figure 6:
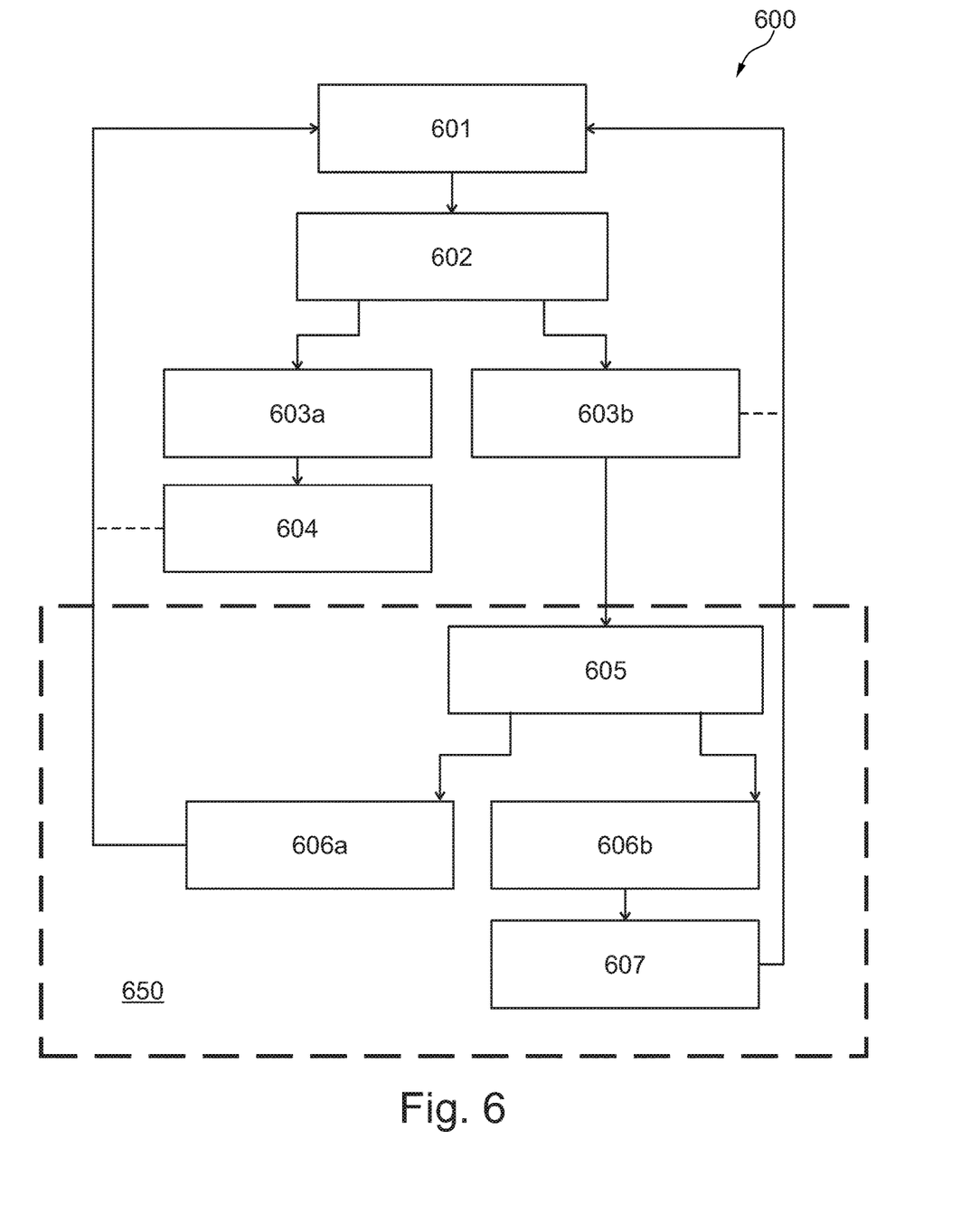
FIG. 6 is a flow chart illustrating an auxiliary oil system control method.

Operation 600 of the engine 10 in some arrangements shown is now described, with reference to FIG. 6.

At step 601, gearbox oil pressure is sensed by the pressure sensor 67.

At step 602, the sensed gearbox oil pressure is compared to a first threshold.

The sensing 601 and comparison 602 of gearbox oil pressure is performed at set, regular intervals in the arrangement being described, for example, every second during flight. In alternative arrangements, the sensing may be continuous, or more or less frequent. In alternative or additional embodiments, the rate of sensing 601 and/or of comparison 602 may be varied depending on other parameters, such as shaft rotation speed.

If the gearbox oil pressure is below (or, in other arrangements, equal to or below) the first threshold (option 603a), the auxiliary pump 61 is activated 604 if it is not already active. If the auxiliary pump 61 is already active, no change is made.

The method 600 then returns to step 601.

If the gearbox oil pressure is above or equal to (or, in other arrangements, above) the first threshold (option 603b), the gearbox oil pressure is compared 605 to a second threshold.

In the arrangement being described, the second threshold is higher than the first threshold. In alternative arrangements, the thresholds may be the same such that the method proceeds straight from step 603b to step 607.

If the gearbox oil pressure is below (or, in other arrangements, equal to or below) the second threshold (option 606a), the status of the auxiliary pump 61 is not changed. If it is currently active, it remains active. If it is currently deactivated, it remains inactive.

The method 600 then returns to step 601.

If the gearbox oil pressure is above or equal to (or, in other arrangements, above) the second threshold (option 606b), the auxiliary pump 61 is deactivated 607 if currently active. No change is made if the pump 61 is currently inactive.

The method 600 then returns to step 601.

The steps 650 relating to deactivation of the auxiliary pump 61 may not be used in some arrangements; for example, a manual over-ride may be needed to deactivate the auxiliary pump. In such arrangements, the method 600 may return to step 601 from step 603b or step 604, as marked with dotted lines in FIG. 6.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, the gas turbine engine comprising:
   an engine core comprising a turbine, a compressor, and a core shaft connecting the turbine to the compressor;
   a fan or propeller;
   a gearbox that receives an input from the core shaft and outputs drive to the fan or propeller so as to drive the fan or propeller at a lower rotational speed than the core shaft;
   a primary oil system driven by the engine core and arranged to supply bearings of the gearbox with oil; and
   an auxiliary oil system comprising:
      an electric pump arranged to be selectively activated, and to supply the bearings of the gearbox with oil, during flight, when activated;
      a sensor arranged to detect windmilling and/or failure of the primary oil system during flight; and
      control electronics arranged to receive an output from the sensor, and to activate the electric pump in response to detected windmilling or failure,
   wherein the sensor is a pressure sensor arranged in the gearbox and configured to monitor gearbox oil pressure,
   wherein the control electronics are arranged to receive an output from the pressure sensor and to activate the electric pump in response to the gearbox oil pressure falling below a threshold.

2. The gas turbine engine of claim 1, wherein the electric pump is powered by a power source other than the engine core.

3. The gas turbine engine of claim 2 wherein the power source is mounted on the engine or on the aircraft.

4. The gas turbine engine of claim 2 wherein the power source is one or more of:
   (i) a further gas turbine engine of the aircraft;
   (ii) a battery;
   (iii) a ram air turbine; and
   (iv) an auxiliary power unit.

5. The gas turbine engine of claim 2 wherein the power source is a further gas turbine engine of the aircraft if the further gas turbine engine is providing power, and a ram air turbine of the aircraft if not.

6. The gas turbine engine of claim 1 wherein the electric pump is selected to be capable of pumping up to 10 liters of oil per minute around the auxiliary oil system.

7. The gas turbine engine of claim 1 wherein the electric pump is selected to be capable of pumping up to 30 liters of oil per minute around the auxiliary oil system.

8. The gas turbine engine of claim 1 wherein the electric pump is a fixed displacement pump.

9. The gas turbine engine of claim 1 wherein the electric pump comprises a pump controller arranged to allow the flow rate around the auxiliary oil system to be varied.

10. The gas turbine engine of claim 1 wherein the auxiliary oil system is sized to provide lubrication sufficient for a rotation speed of the fan or propeller of above 300 revolutions per minute.

11. The gas turbine engine of claim 1 wherein the gas turbine engine is a turbofan engine.

12. The gas turbine engine of claim 1 wherein the bearings of the gearbox comprise at least one journal bearing.

13. The gas turbine engine of claim 1 wherein the primary oil system and the auxiliary oil system each have separate connections to the gearbox.

14. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

15. An auxiliary oil system for an aircraft gas turbine engine having a gearbox arranged to be lubricated by a primary oil system, the auxiliary oil system comprising:
an electric pump arranged to be selectively activated, and to supply bearings of the gearbox with oil, during flight, when activated;
a sensor arranged to detect windmilling and/or failure of the primary oil system during flight; and
control electronics arranged to receive an output from the sensor, and to activate the electric pump in response to detected windmilling or failure,
wherein the sensor is a pressure sensor configured to be arranged in the gearbox of the gas turbine engine and configured to monitor gearbox oil pressure,
wherein the control electronics are arranged to receive an output from the pressure sensor and to activate the electric pump in response to the gearbox oil pressure falling below a threshold.

* * * * *